Dec. 13, 1938.   J. M. NAIMAN   2,139,768
MEANS FOR DETERMINING THE HEAT VALUE OF FLOWING FLUIDS
Filed Jan. 24, 1935   3 Sheets-Sheet 1
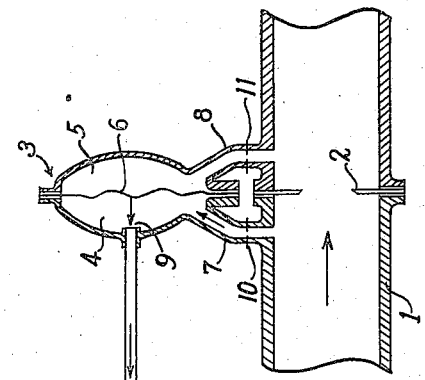
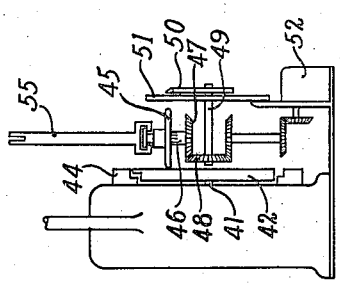
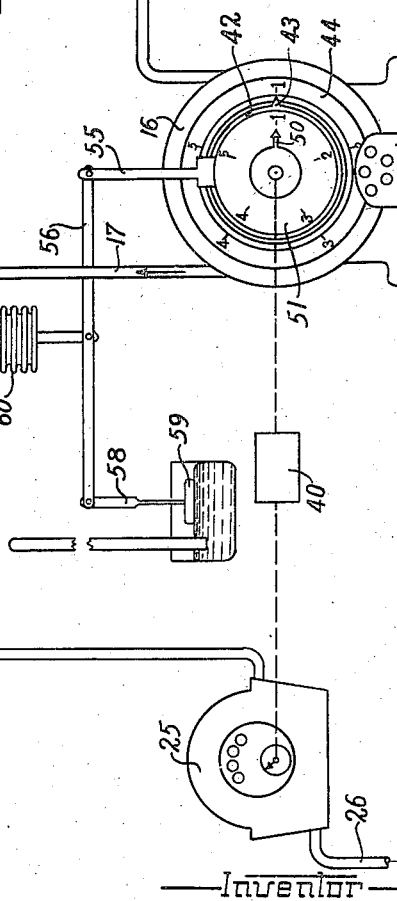
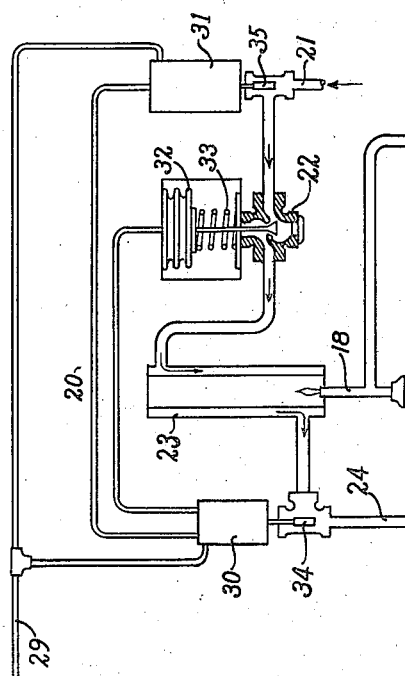
Inventor
Julius M. Naiman
By Morris Spector,
Attorney Dec. 13, 1938.    J. M. NAIMAN    2,139,768
MEANS FOR DETERMINING THE HEAT VALUE OF FLOWING FLUIDS
Filed Jan. 24, 1935    3 Sheets-Sheet 2
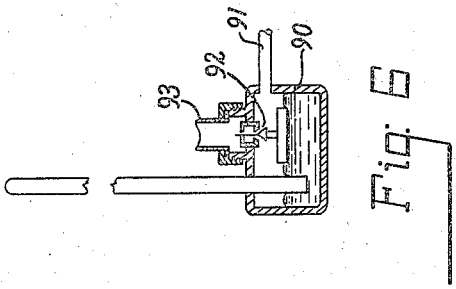
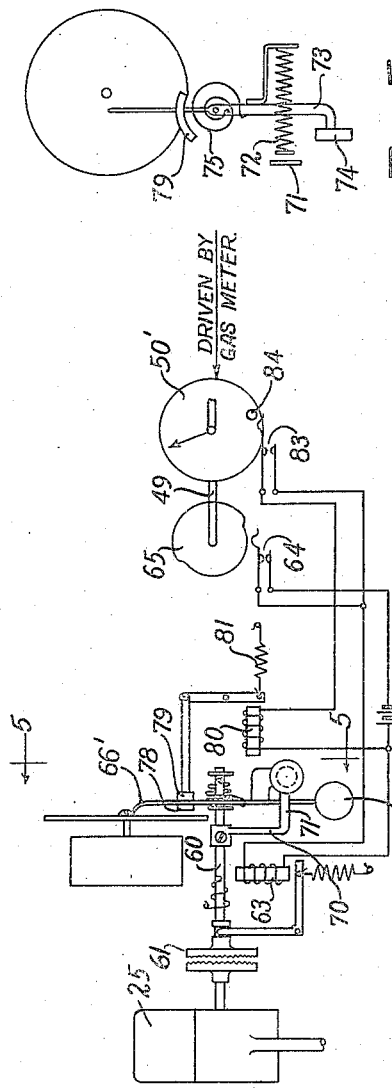
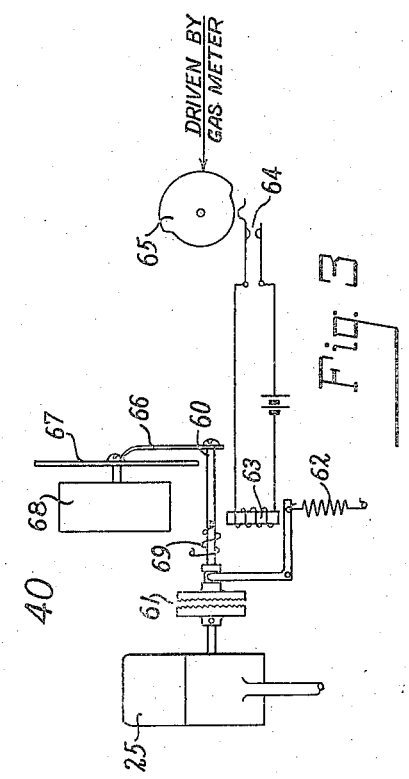
Inventor
Julius M. Naiman
By Morris Spector,
Attorney

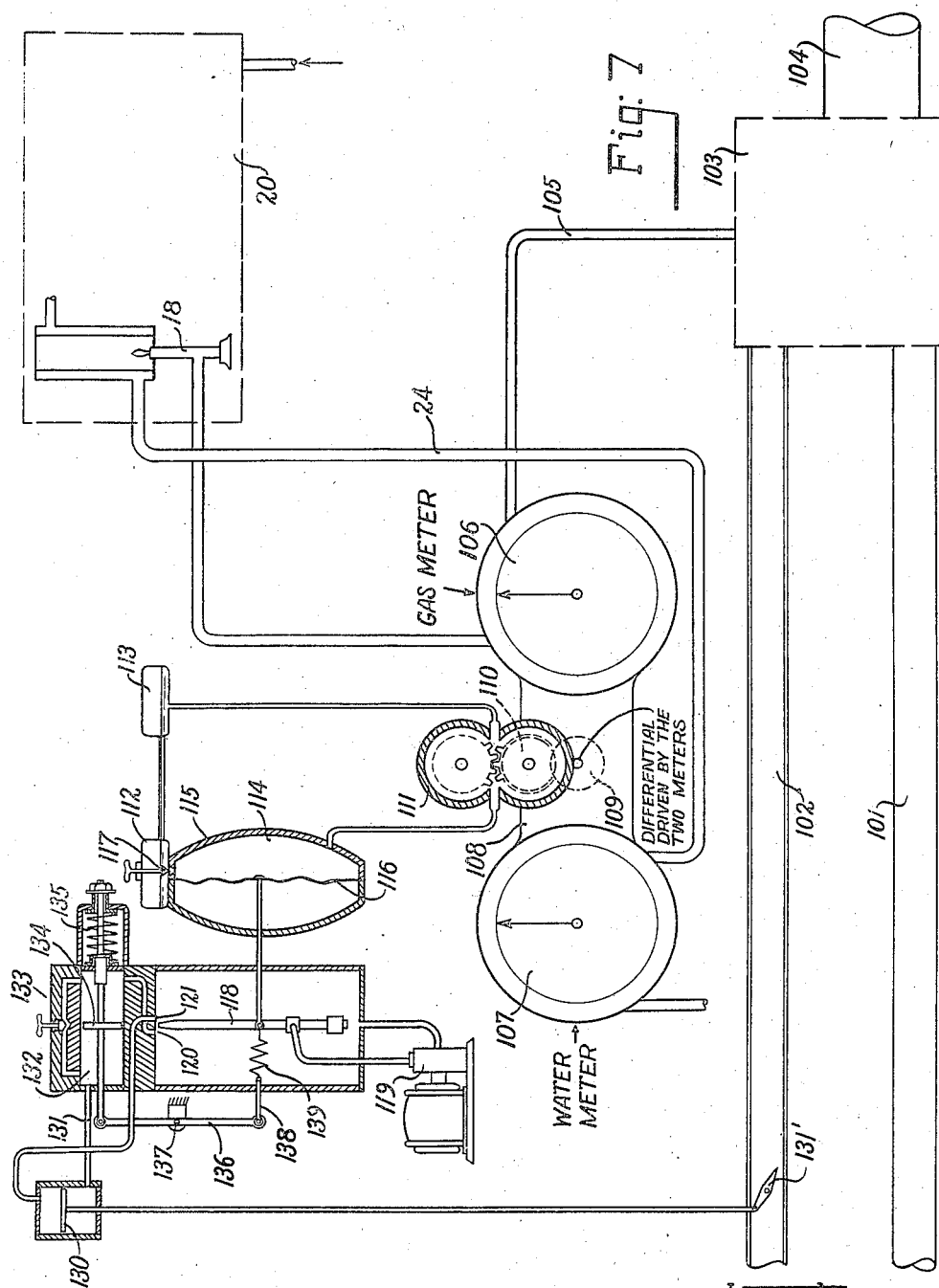

Patented Dec. 13, 1938

2,139,768

UNITED STATES PATENT OFFICE

2,139,768

MEANS FOR DETERMINING THE HEAT VALUE OF FLOWING FLUIDS

Julius M. Naiman, Chicago, Ill.

Application January 24, 1935, Serial No. 3,224

2 Claims. (Cl. 73—190)

This invention relates to means for ascertaining or fixing the heat content of flowing fluids.

In the measurement of flowing combustible fluids, whether gaseous or liquid, it is frequently desirable to know the quantity or rate of heat flow, rather than or in addition to the amount of fluid flowing. It is one of the objects of the present invention to provide a simple and accurate means for measuring and indicating the calorific value of a flowing fluid, both in terms of the heat value per unit volume of the gas flowing at the particular instant that the indication is read, and the total number of heat units over any period of time.

Also, in the measurement of flowing steam, it is frequently desirable to know the quantity of heat flow; while in the measurement of flowing refrigerants, such as ammonia, it is frequently desirable to know the quantity of refrigeration flow, i. e., of the heat of vaporization of the ammonia. By my invention this information is readily obtained.

I accomplish the above results as follows: A small definite fraction of the flowing fluid, say, of a combustible gas, is shunted through a small proportion orifice. This small mass of gas is metered, after which it is led to a burner of a calorimeter, and burned. The heat absorber is of the conventional counterflow design, so that the flue gases, when they finally leave the heat absorber, are in contact with the portion of the heat absorber where the cold water enters, and the heated water leaves the heat absorber where it is in contact with the hottest flue gases. The flue gas temperature is reduced approximately to room temperature by the time the gases leave the heat absorber, so that the heat carried away by the gases is negligible, practically all of the heat of the burned gas being absorbed by the flowing water. The flow of water through the heat absorber is regulated in such a manner that the rise in temperature of the water is maintained constant, say, at 100° F. As a result, the amount of water that flows through the heat absorber is directly proportional to the total heat absorbed, or to the total heat of the gas burned in the absorber. Since the latter, in turn, represents a definite fraction of the total fluid flowing in the pipe, it is evident that the amount of water leaving the heat absorber and metered by the hot water meter is a measure of the total heat of the flowing fluid.

Since the hot water meter registration is proportional to the total heat of the flowing fluid, while the gas meter registration is proportional to the volume of the flowing fluid, the ratio of these two meter registrations is a measure of the calorific value of the flowing gas at the pressure and temperature conditions at which the gas meter indicates. It is one of the objects of the present invention to provide means for causing the gas meter registration to indicate at some standard condition, say, thirty inches mercury pressure and 60° F. temperature. When this is done, the ratio of the water meter reading to the gas meter reading indicates the calorific value of the flowing gas at the fixed standard conditions.

It is a further object of the present invention to provide a simple and reliable ratio meter which will indicate the ratio of the speeds of two independently rotatable members. Where those two members are, respectively, the rotatable elements of the water meter and of the gas meter, the ratio meter indicates the heat content of the flowing gases. The ratio meter is of general application wherever it is desired to obtain an indication of the ratio of the speeds of two rotating members. For instance, in a plant where combustible gases are made from oil, one meter may indicate the heat content of the oil consumed, whereas the other meter indicates the heat content of the gas produced. The ratio between the two indicates the efficiency of the process.

It is a further object of the present invention to provide an apparatus for controlling the quality or total heating value of a flowing mixture of fluids. For instance, natural gas is frequently diluted with leaner gases in order to reduce the heat content per unit volume thereof. In such a process it is desirable that the calorific value of the mixture be maintained constant. I obtain the above results by measuring the heat content of the flowing mixture in the manner above set forth, and then providing means for increasing or decreasing the ratio of the natural gas to the leaner gas, of the mixture, as the heat content of the mixture increases or decreases. The apparatus whereby this is obtained consists, essentially, of a gas meter and a hot water meter, as previously set forth, and suitable gearing between the two, including a differential so arranged that, when the speeds of the two meters are relatively correct, the differential element remains stationary. An upsetting of the balance between the two meters causes the differential element to move in one direction or the other, depending upon whether the heat content of the mixed gas is too high or too low. This movement is utilized to control the rate of flow of one of the gases into the mixing pipe to increase or decrease the heat of the mixture.

The attainment of the above and further objects of the present invention will be apparent from the following specification taken in conjunction with the accompanying drawings, forming a part thereof.

In the drawings:

Figure 1 is a diagrammatic view illustrating a system for measuring the heat content of flowing combustible fluids in accordance with my invention;

Figure 2 is an end view of the gas meter of Figure 1;

Figure 3 is a diagrammatic view of the ratio meter of Figure 1;

Figure 4 is a diagrammatic view of another type of ratio meter;

Figure 5 is a fragmentary view taken along the line 5—5 of Figure 4;

Figure 6 is a diagrammatic view illustrating an alternate apparatus for correcting the gas meter reading for changes in atmospheric pressure; and Figure 7 is a diagrammatic view illustrating the method of controlling the mixture of two gases, at least one of which is combustible, to maintain the heat content of the mixture constant.

Reference may now be had more particularly to Figure 1 of the drawings. At 1 is indicated a main pipe through which flows a fluid, in this case a gas, in the direction indicated by the arrow. A measuring resistance, which may be an orifice plate, nozzle, Venturi tube, or the like, is indicated at 2. A flow deviator 3, containing two chambers 4 and 5 separated by a very sensitive featherweight diaphragm 6, is connected by short connections 7 and 8 with the pipe 1 on the upstream and downstream sides, respectively, of the measuring resistance 2. The diaphragm 6 controls a needle valve 9, that controls the outlet from the chamber 4. In the connections 7 and 8 are orifice plates 10 and 11, respectively, of identical size. The orifice plate 10 has a measuring function, which will be presently described. The orifice 11 is for the purpose of synchronizing the filling of the two chambers 4 and 5, and to prevent overloading of one side of the diaphragm when the flow is first started or any sudden change in pressure occurs.

When gas begins to flow through the main pipe, a pressure difference is set up by the orifice plate 2. The lower pressure is immediately communicated to the chamber 5, the higher pressure being communicated to the chamber 4. The preponderance of pressure in the chamber 4 over the chamber 5 causes the diaphragm 6 to open the valve 9, thus permitting gas to flow from the main pipe 1, through the connection 7 having the orifice 10 therein. There is a pressure drop resulting from the flow of gas past the orifice 10, with the result that the pressure difference on the two sides of the diaphragm 6 is reduced. Equilibrium is reached when the diaphragm 6 maintains the valve 9 open to such an amount that the flow through the orifice 10 in the connection 7 produces a drop in pressure equal to the drop produced at the orifice 2, less a very small amount required to flex the featherweight diaphragm, which may be neglected. The net effect is that the pressures on the upstream side of the orifices 2 and 10 are equal, and the pressures on the downstream side of these two orifices are also equal. The differential pressures and the static pressures on the two orifice plates are the same and the temperatures of the gases are the same. Therefore, since the specific gravities are also the same, in the absence of any change in the relationship of the constants of the two orifices, the flow through the orifice 10 will be a fixed proportion of the flow through the orifice 2. The design of the orifices 2 and 10 is such that the flow through the orifice 10, is, say, 1/1,000 or 1/10,000 of the flow through the orifice 2. The orifice 10 is, preferably, of a construction such as is shown more particularly in my pending application Serial #759,029, filed December 24, 1934, to which reference may be had for a description of the same. It is sufficient here to state that the orifice 10 is of a very small size, comparable to a pin hole, and so constructed as to maintain substantially a constant coefficient of discharge as the rate of flow therethrough varies over a wide range.

The gas from the chamber 4 flows through the valve 9 and a pipe 15 to an integrating wet meter 16. From the wet meter the gas flows through a pipe 17 to a burner 18 of a calorimeter 20. Water flows through the calorimeter from a source of water supply connected to the pipe 21, through an automatic valve 22, a conventional counterflow heat absorber 23 of the calorimeter, then out through a pipe 24 and an integrating water meter 25, from which the water is ultimately discharged at 26.

The rate of flow of water through the calorimeter is controlled by the valve 22 which, in turn, is controlled by a sub-master thermostat 30 and a master thermostat 31, to maintain a constant rise in temperature of the water as it flows through the calorimeter, say, a rise of 100 degrees. The thermostats receive power from a compressed air line 29 for effecting the necessary operations. If the heat of the flame 18 is such that the rise in temperature of the water tends to exceed or fall short of the set value, the automatic valve 22 is actuated to increase or decrease the rate of flow of water, as required, to maintain the requisite temperature rise. The valve 22 is opened by a sylphon bellows 32 against the action of a spring 33 which tends to close the valve. The extent of opening of the valve is determined by the pressure in the bellows 32, which is regulated by the sub-master thermostat 30, which includes a thermal element 34 responsive to the temperature of the effluent from the heat absorber 23. The thermostat 30, acting on the bellows 32, and thus on the valve 22, regulates the rate of flow of water through the calorimeter to maintain the temperature of the effluent from the heat absorber at a value determined by the setting of the sub-master thermostat. This setting is varied by the master thermostat 31 in accordance with the temperature of the intake water as determined by a thermal element 35. The regulation by the sub-master thermostat is, therefore, such as to maintain a fixed rise in temperature of the water flowing through the heat absorber. The heat absorber 23, and the means for regulating the rate of flow of water so as to maintain a constant temperature rise of the water, regardless of the temperature of the incoming water, is standard equipment and does not, per se, form a part of the present invention.

Since the hot water integrating meter 25 measures the total volume of water flowing through the calorimeter, and since the temperature rise of the water flowing through the calorimeter has been constant, it is apparent that the registration of this meter is proportionate to the heat content of the gas burned at the burner 18. Also, since the amount of gas burned at 18 is proportionate to the amount of gas flowing through the main pipe 1, it is evident that the registration of the meter 25 is proportional to the heat content of the gas flowing through the main pipe, and by proper calibration can be made to read directly the total B. t. u. of the total gas flowing through the pipe 1.

The integrating wet meter 16 indicates the total volume of gas flowing through the main pipe 1 at room temperature and pressure. If, now, this reading is corrected for temperature and pressure changes, so that the meter registration indicates the volume under some standard conditions, then the ratio of the reading of the meter 25 to the reading of the meter 16 will be the average heat content per unit volume of the gas at standard pressure and temperature. In connection with the meter 16 I provide an apparatus, which will be presently described, for correcting for atmospheric temperature and pressure variations, so as to register the volume of gas flow at predetermined standard conditions, say, 60° F. temperature and 30 inches of mercury pressure. I also provide a ratio meter 40, of a construction to be presently described, which indicates the ratio of the speed of the meter 25 to that of the meter 16, that is, the heat content of the flowing gas per unit volume. The time lag of the apparatus is very small, so that any change in the calorific value of the gas flowing in the pipe 1 is quickly manifested by change in rate of flow of water and, therefore, a change in rate of rotation of the meter 25. Therefore the registration of the meter 40, at any instant, indicates the calorific value of the gas flowing at substantially that instant.

The means for correcting the registration of the meter 16 for pressure and temperature variations is shown more particularly in Figures 1 and 2. The meter 16 includes a meter-driven shaft 41 whose rotation is a direct measure of the volume of gas flowing through the meter. This shaft drives a disc 42 that carries a pointer 43 which moves over a fixed scale 44. If desired, a revolution counter may be provided. The disc 42 drives a friction wheel 45. The wheel 45 is keyed to a shaft 46 to rotate the same, while free to move longitudinally on the shaft. The shaft 46 carries a bevel gear 47 which drives a gear 48 on a shaft 49. The shaft 49 operates a pointer 50 that moves over a fixed scale 51, and it also operates a revolution counter 52.

The position of the friction wheel 45 on the shaft 46 is varied by a link 55 which is pivoted to one end of a beam 56. The opposite end of the beam is pivoted to a rod 58 on a float 59 in the pot of a mercury barometer. A thermostatic bellows 60 is pivotally connected to the beam intermediate the ends thereof. The adjustment of the parts is such that, when the atmospheric pressure and temperature are at some standard value, say 30 inches of mercury, and 60° Fahrenheit, the position of the wheel 45 is such as to maintain a one-to-one driving ratio between the shaft 41 and the shaft 49. If the room temperature increases, the bellows 60 expands and moves the beam 56 to shift the wheel 45 closer to the center of the disc 42 and thus slow down the speed of the shaft 49 with respect to the shaft 41, the reduction in speed being made proportionate to the increase in gas volume resulting from the temperature rise. If the barometric pressure decreases, the mercury will drop in the barometer tube and rise in the barometer pot, with the result that the float 59 rises and, through the rod 58, acts on the beam 56 to lower the link 55 to move the friction wheel 45 closer to the center of the disc 42 and thus slow down the speed of the shaft 49 with respect to the shaft 41. It is apparent from the description thus far given that the position of the wheel 45 will be shifted back and forth to compensate for pressure or temperature changes so that the meter 16 will operate the counter 52 to give a registration of the volume of gas flow, corrected for variations in room temperature and pressure.

Reference may now be had more particularly to Figure 3 wherein I show, diagrammatically, the ratio meter 40 of Figure 1. The water meter 25 is adapted to be connected to a shaft 60 by means of a clutch 61, to drive the shaft. The clutch is normally disengaged, being maintained disengaged by a spring 62. An electro-magnet 63, controlled by a switch 64, is provided for causing the two clutch members to engage and thus establish driving connection between the water meter 25 and the shaft 60. The switch 64 is controlled by a cam 65 driven by the shaft 49 of the gas meter 16 of Figure 1. During each revolution of the wet meter shaft 49 the cam 65 closes the contacts 64 and maintains them closed until the shaft 49 has made a predetermined rotation, in this instance 180°. During the next 180° of rotation of the shaft 49 the switch 64 is open. The shaft 60 carries a recording pen arm 66 which moves over a chart 67 driven at a constant speed in any desired manner, as, for instance, by a spring motor 68. When the magnet 63 is deenergized, thus declutching the shaft 60 from the meter 25, a coiled spring 69 returns the shaft to its zero position. The arrangement is such that the meter 25 never drives the shaft 60 through an angle of more than, say, 45°, during the time that the shaft 49 makes one half revolution.

It is apparent that the angular movement of the recording pen arm 66 during any single revolution of the shaft 49 is determined by the speed of the meter 25. Hence, the pen 66 traces a line on the chart 67 of a length proportionate to the extent of movement of the water meter during one half turn of the shaft 49 of the gas meter. The shaft 49 is made to operate at a comparatively rapid rate, as by making the displacement of the wet meter per revolution of the drum quite small. The recording pen will leave a record of the ratio of the speed of the water meter to the speed of the gas meter. This is the ratio of the amount of heat units in the gas consumed to the volume of the gas consumed, or the number of heat units per unit volume.

While in Figure 1 I have shown my invention as applied to the determination of the heat content of a flowing combustible gas, it is to be understood that the invention is not limited thereto, since it may be applied to determine the heat content of any flowing fluid. For instance, the flowing fluid may be steam, in which case the heat absorber 23 and the Bunsen burner 18 would be replaced by suitable means for transferring heat from the flowing steam to the flowing water, the regulation of the rate of flow of the heat absorbing water being the same. As another example, the fluid flowing through the pipe 1 may be a refrigerant, in which case the Bunsen burner 18 and the heat absorber 23 would be replaced by suitable means for effecting a transfer of heat from the flowing water to the flowing refrigerant, in which case the regulation would be substantially the same as shown, except that the rate of flow would be varied to maintain a constant drop in temperature of the flowing water rather than a constant rise in temperature thereof.

For best results the gas meter should be flushed completely in two seconds. To do this it is necessary to increase the speed of the present standard wet gas meters about ten times. This can be done by decreasing the volume of the gas chambers of the meter drum to one-tenth of their present size. Then, for a given flow, the meter drum will operate ten times as fast. Although the pressure drop through the meter is increased, this is not objectionable because there is more than sufficient pressure available for operating the meter, it being remembered that the Bunsen burner requires but a negligible amount of pressure to maintain an outward flow of the combustible gas.

In Figure 4 I have shown a modified form of ratio meter corresponding to the ratio meter of Figure 3. In this case, as in the previous case, the water meter drives a shaft 60 through an electro-magnetically controlled clutch 61 that is controlled by contacts 64 which are actuated by a cam on the shaft 49 of the gas meter. The difference here is that the recording pen arm 66' is loose on the shaft 60 and is adapted to be driven by an arm 70 keyed to the shaft and having a projecting portion 71 which is adapted to bear against a spring 72 carried by the lower extension 73 of the recording pen arm. A counterweight 74 on the lower end of the pen arm biases that arm to its zero position, as does also a light torsion spring 75. A clamp, including a stationary member 78 and a movable member 79, is provided for holding the recording pen arm against turning with the shaft 60, except at such times as turning is desired, when the clamp is released. An electro-magnet 80 is provided for releasing the clamp 79, said electro-magnet acting against a spring 81 which maintains the clamp engaged when the electro-magnet is not energized. A switch 83 is provided for energizing the electro-magnet 80 at the proper time and thus unclamp the recording pen arm. The switch 83 is momentarily closed by a short projection 84 on the disc 50' of the wet meter, said projection causing closure of the switch 83 slightly before the cam 65 releases the switch 64. It is to be noted that the switch 64 is closed by the cam 65 during an extended part of each revolution of the shaft 49. During the time that the switch 64 is closed, the shaft 60, and the arm 70, are being rotated by the hot water meter 25. The projecting portion 71 is therefore compressing the spring 72 and tending to move the recording pen arm. The recording pen arm is, however, held against motion by the clamp. Slightly before the switch 64 is opened by the cam 65, the projection 84 closes the switch 83, thus energizing the magnet 80 and effecting a release of the recording pen arm clamp. The pen arm therefore swings to a position determined by the position of the projecting portion 71 of the arm 70, namely, to a position determined by the amount of rotation of the shaft 60 by the water meter 25. A moment later the switches 83 and 84 are opened. Opening of the switch 83 causes deenergization of the magnet 80 and permits the spring 81 to clamp the recording pen arm in the position to which it happened to have been moved. Deenergization of the magnet 63 causes the spring 62 to declutch the shaft 60 from the water meter and thus allow the spring 69 to return the shaft 60 to its zero position. It is thus apparent that, during each revolution of the shaft 49, the pen arm is moved once, to a new position determined by the amount of rotation of the water meter 25 during the preceding half revolution of the gas meter drum. The pen 66' thus makes a fine line record indicating the ratio of the speeds of the two meters, which is an indication of the heat content of the flowing gases per unit volume of the flowing gases.

Reference may now be had more particularly to Figure 6 wherein I show an alternate way of correcting the registration of the gas meter for variations in pressure. In this construction gas from the wet meter flows to the pot 90 of mercury barometer, by way of a pipe 91, and out from the pot through a float-controlled check valve 92 to an outlet 93, which may discharge into the atmosphere or to a Bunsen burner as shown in Figure 1. When the pressure in the wet meter begins to exceed, say, 30 inches of mercury, the mercury level in the pot 90 drops, thus lowering the float and opening the valve 92 wider. This creates a drop in pressure which tends to reduce the excess pressure over 30 inches of mercury back to normal. When the pressure begins to drop below 30 inches of mercury, the mercury level in the pot 90 rises, tending to reduce the opening of the valve 92, thus building up the pressure back to 30 inches of mercury. The volume of gas metered will therefore be at 30 inches of mercury.

Reference may now be had more particularly to Figure 7 wherein I show an arrangement for controlling the ratio of the mixture of two gases in such a way as to maintain the heat content of the mixture constant. A combustible gas flowing in the pipe 101, and another gas, say, air, flowing in the pipe 102, are mixed in a mixing chamber 103 in a manner well known in the art, and delivered to a pipe 104. A small amount of the mixed gas is taken by a pipe 105 through a wet meter 106, which measures the amount of gas taken, and thence conveyed to a Bunsen burner 18 of a calorimeter 20. The heat of the burning gases is absorbed by a flowing stream of water which is regulated to maintain the rise in temperature of the water constant, in the same manner as has been explained in connection with the calorimeter 20 of Figure 1. The hot water is conveyed by way of a pipe 24 to a hot water meter 107. The two meters 106 and 107, through suitable gears in a gear box 108, drive two elements of a differential, the third element of which is indicated at 109. It is apparent, from the description thus far given, that the hot water meter 107 will register the total heat content of the gases burned, and the gas meter 106 will register the total amount of the gas burned. The ratio of the two indicates the heat content per unit volume of gas. If the heat per unit volume of gas is to be maintained constant, then the ratio of the speed of the water meter to the speed of the gas meter must be constant. If one of the meters is made to drive one of the elements of a differential, through suitable speed changing gears, and the other meter is made to drive the other element of the differential, also through suitable speed changing gears, the arrangement can be made such that, when the ratio of the speeds of the two meters is at a certain predetermined value, the speeds of the two meter driven elements of the differential will be the same, and the third element of the differential will remain stationary. This is the arrangement of the gearing in the gear box 108. Therefore, when the heat content of the mixed gases is at its predetermined correct value, the third element 109 of the differential is stationary. Should the heat content of the gases change in one direction or the other, the third element 109 of the differential will be rotated in one direction or the other, as determined by the direction of change of heat content. The third element of the differential 109 is geared to a gear 110 that drives a gear pump 111. When the gear pump is rotated it causes circulation of oil in a closed oil system including a pair of connected oil reservoirs 112 and 113 and one chamber 114 of a regulator 115. The chamber 114 is separated from the rest of the regulator by a featherweight diaphragm 116 and is connected with the reservoir 112 by means of a small externally adjustable valve 117. The diphragm 116 controls the position of a pivoted nozzle 118 that receives liquid from a constantly driven pump 119 and projects a jet of liquid normally directly between two outlets 120 and 121. When the gear pump 111 is not rotating, and the various parts are in equilibrium, the nozzle 118 is in the position shown in the drawings, and the pressures of the oil from the jet, on the two openings 120 and 121, are the same. If the jet is moved, say, to the right, the opening 121 receives more oil than does the opening 120. As a result, the pressure on the upper side of a piston 130 becomes greater than the pressure on the lower side thereof, and the piston is moved downwardly. Downward movement of the piston forces oil from the lower side thereof, through the pipe 131 to a chamber 132 of a stabilizer 133, thus forcing a piston 134 to the right, against the action of a spring 135. This causes a lever 136 to swing clockwise about its pivot 137 and draw a rod 138 to the left, thus increasing the tension on a spring 139 which tends to bring the nozzle 118 back to its neutral position. Movement of the piston 130 controls a valve 131' in the air pipe 102 for increasing, or decreasing, the amount of air mixed with the combustible gas. It may be seen, from the description thus far given, that if the nozzle 118 is moved to the left instead of to the right, the pressure on the opening 120 exceeds that on the opening 121, thus building up a pressure on the right hand side of the piston 134 which causes that piston to move to the left and to build up a preponderance of pressure on the lower side of the piston 130 over that on the upper side thereof. The valve 131' is thus actuated in its closing direction. Also, the rod 136 is rotated counter-clockwise and thus moves the link 138 to the right and thereby tending to restore the nozzle 118 to its neutral position. The movement of the nozzle, under the control of the diaphragm 116, thus controls the pressures on the two sides of the piston 130, thereby controlling the valve 131'. The stabilizer is provided merely for preventing hunting of the apparatus. The system shown in Figure 7 is exceedingly fast acting since any change in the heat content of the mixed gases is immediately manifested by a change in the amount of heat produced by the Bunsen burner 18, which is immediately manifested by a change in rate of flow of the heat absorbing water, thereby immediately changing the ratio of the speeds of the meters 106 and 107 and, thereby, immediately turning the gear pump in one direction or the other. This produces an immediate upsetting of the balance between the oil pressure on one side of the diaphragm 116 and the pressure of the spring 139 exerted on the other side of the diaphragm, so that the diaphragm immediately actuates the nozzle 118, which immediately actuates the valve 131' to effect a correction of the mixture.

Instead of the gear pump, which is driven by the differential, any other means may be used for creating a positive or negative pressure, as the case may be, upon rotation of the third element of the differential in one direction or the other. For instance, a small fan may be used, and arranged, with reference to the sensitive diaphragm that controls the nozzle, in such a manner as to create a positive or a negative pressure thereagainst, depending upon the direction of rotation of the fan by the differential.

The gas meter shown in Figure 7 is, preferably, one such as shown in Figure 2. The rotation of the active element of the gas meter, that is, the element which drives the gear train to the differential, is at a speed determined by the speed of the meter drum, as corrected for pressure and temperature variations from standard conditions.

In compliance with the requirements of the patent statutes I have here shown and described a few preferred embodiments of my invention. It is, however, to be understood that the invention is not limited to the precise embodiments here shown, the same being merely illustrative of the principles of the invention.

What I consider new and desire to secure by Letters Patent is:

1. Means for determining the available heat, per unit of measure of quantity of fluid, of a stream of flowing fluid, which comprises means for creating a continuous flow of sampling fluid from said stream, a meter for measuring the flow of the sampling fluid, means for transferring the available heat of the sampling fluid to a flowing stream of water, means for maintaining the temperature change of the water constant by regulating the rate of flow thereof, a meter for measuring the amount of water used, and means operatively connected with said meters and responsive to changes in the ratio of the rates of operation of the two meters for determining the heat content per unit of the measure of quantity of the flowing fluid.

2. Means for measuring the total heating value of a flowing combustible fluid and the heating value per unit of quantity measure of the flowing fluid, which comprises means for diverting a small fixed proportional part of the flowing fluid; a meter for measuring the amount of the diverted flow of the fluid; means for measuring the available heat of the diverted fluid; said available heat measuring means including means for burning the fluid and transferring the resulting heat to a flowing fluid and means for maintaining the temperature rise of the latter constant by regulating the rate of flow thereof; an integrating meter for measuring the amount of the last mentioned flowing fluid that is used, said integrating meter being calibrated to indicate the available heat content of the first mentioned combustible fluid; and a ratio meter cooperatively connected with said meters for ascertaining the ratio of the speeds of the two first named meters.

JULIUS M. NAIMAN.